United States Patent
Vig et al.

(10) Patent No.: US 11,372,686 B1
(45) Date of Patent: Jun. 28, 2022

(54) CAPACITY MANAGEMENT FOR GLOBAL RESOURCES

(71) Applicant: Amazon Technologies, Inc., Seattle, WA (US)

(72) Inventors: Akshat Vig, Seattle, WA (US); Somasundaram Perianayagam, Seattle, WA (US); Arijit Choudhury, Mountain View, CA (US); Oren Yossef, Bellevue, WA (US); Shitanshu Aggarwal, Seattle, WA (US); Sharatkumar Nagesh Kuppahally, Issaquah, WA (US); Yang Nan, Kirkland, WA (US); Arturo Hinojosa, Redwood City, CA (US); Mark Roper, Bainbridge Island, WA (US); Wen Han Albert Huang, San Jose, CA (US); Sudhir Konduru, Fremont, CA (US); Alexander Richard Keyes, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 46 days.

(21) Appl. No.: 16/915,854

(22) Filed: Jun. 29, 2020

(51) Int. Cl.
*G06F 9/50* (2006.01)
*G06F 11/14* (2006.01)
*H04L 67/1021* (2022.01)
*H04L 67/1008* (2022.01)

(52) U.S. Cl.
CPC .......... *G06F 9/505* (2013.01); *G06F 11/1464* (2013.01); *H04L 67/1008* (2013.01); *H04L 67/1021* (2013.01); *G06F 2201/80* (2013.01); *G06F 2209/503* (2013.01)

(58) Field of Classification Search
CPC ................. G06F 9/505; G06F 11/1464; G06F 2209/503; G06F 2201/80; H04L 67/1008; H04L 67/1021
See application file for complete search history.

(56) References Cited

U.S. PATENT DOCUMENTS

2012/0317168 A1* 12/2012 Driesen .................. G06Q 30/06
709/202

OTHER PUBLICATIONS

"Regions, Availability Zones, and Local Zones—Amazon Elastic Compute Cloud", Available Jul. 13, 2020 at https://docs.aws.amazon.com/AWSEC2/latest/UserGuide/using-regions-availability-zones.html, pp. 1-12.
"Global Infrastructure—Overview of Amazon Web Services", AWS, Available Jul. 13, 2020, p. 5.

* cited by examiner

*Primary Examiner* — Sisley N Kim
(74) *Attorney, Agent, or Firm* — Robert C. Kowert; Kowert, Hood, Munyon, Rankin & Goetzel, P.C.

(57) ABSTRACT

A service provider network may provider one or more global cloud services across multiple regions. A client may submit a request to create multiple replicas of a service resource in respective instantiations of a service in the multiple regions. The receiving region of the request may determine the capacities of the multiple regions as to serving respective replicas of the service resource. The receiving region may provide a response to the client based on the determined capacities of the regions.

20 Claims, 8 Drawing Sheets

CAPACITY MANAGEMENT FOR GLOBAL RESOURCES

BACKGROUND

Cloud storage and computing services provide customers cost-efficient access to remote storage and computing resources. Through network connections, the customers may access and utilize the resources, operated by the customers themselves and/or third-party service providers (collectively named "service providers" hereinafter), to implement various cloud services. Generally, a service provider may establish the resources with numerous interconnected computing devices, e.g., data centers housing significant numbers of network-connected computing systems. Customers of the cloud services may reside at different geographic locations. Thus, to optimize the service cost, reliability and availability, and performance, the service provider may strategically allocate the resources at various geographic locations, e.g., locations world-wide. Given complexity of the global resource allocation in the service provider network, it is thus desirable to have systems to manage capacity of the global resources.

Figure 1:
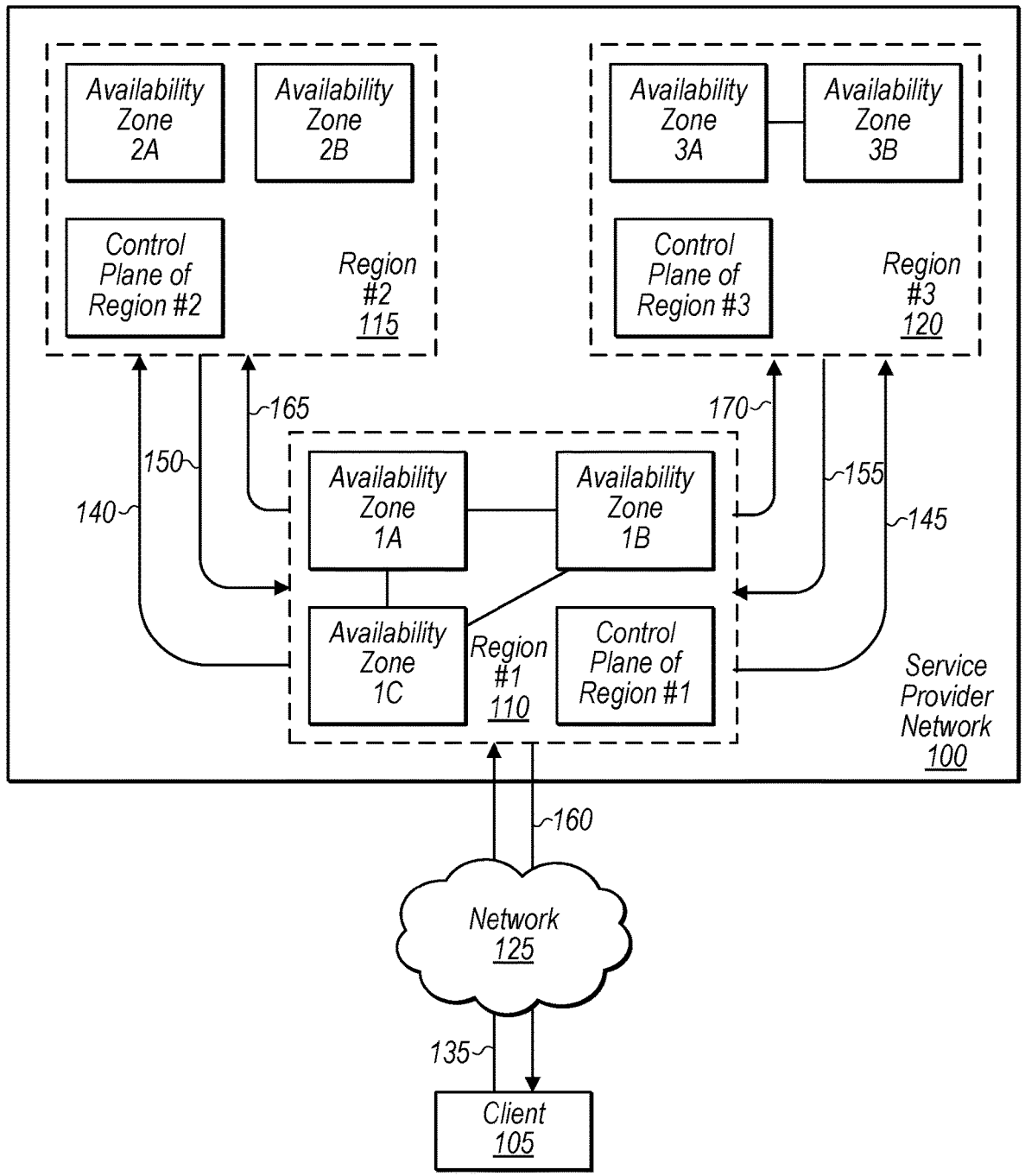
FIG. 1 is a block diagram showing an example service provider network with capacity management, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various techniques to manage capacity of global resources in a service provider network are described in this disclosure. In some embodiments, the service provider network may provide various network-based services, also referred to as cloud-based services, which may be accessible by clients (or subscribers) of those services through various network connections. For instance, the service provider network may provide cloud-based storage service(s), computing service(s), media streaming service(s), e-mail service(s), networking service(s), etc. In some embodiments, the service provider network may include numerous data centers hosting various storage, computing and networking resources, to implement the various cloud-based services. The various storage, computing and networking resources may include, for example, collections of physical and/or virtualized compute servers, storage devices, networking equipment and the like, needed to implement, configure and distribute the various network-based or cloud-based services offered by the service provider. In some embodiments, a virtual computing service implemented at a provider network may enable clients to utilize one or more guest virtual machines (which may be referred to herein as "virtualized compute servers", "compute instances" or simply as "instances") for their applications, with one or more compute instances being executed on any given instance host of a large fleet of instance hosts. Generally speaking, any of a variety of networking protocols, including Transmission Control Protocol/Internet Protocol (TCP/IP) or User Datagram Protocol (UDP), may be used to access the resources of a provider network, and for communications between different resources of the provider network.

In some embodiments, the service provider network may strategically allocate the data centers in various global geographic locations to serve clients (or subscribers) around the world-wide. These global geographic locations may be designed as "regions" each of which may correspond to one or more cities, states, or countries. A client may select one or more regions in geographic proximity to the client and/or users of the client to host a service to reduce network latency and improve service performance. For instance, the service provider network may include resources allocated in a region in U.S. East (e.g., North Virginia), a region in Asia Pacific (e.g., Sydney), a region in Europe (e.g., Frankfurt), and so on. A client in the east coast of the U.S. may select the U.S. East region to host a storage service. Alternatively, the client may additionally select the Asia Pacific region to host the storage service for uses of the client in Australia. To achieve desired levels of availability, fault-resilience and performance, one region may further include multiple distinct locations, referred to as "availability zones", within the region. For example, the U.S. East region may include three availability zones in three different cities in the North Virginia region. Thus, a region may generally cover a relatively large geographic area, whilst an availability zone may refer to a specific location in the region. In some embodiments, one availability zone may span one or more data centers, and the data centers of the availability zones within one region may consist of redundant power, networking, and connectivity, housed in separate facilities from one another. For instance, the three availability zones in the U.S. East region may each consist of one or more data centers. Besides the storage, computing and networking resources, the data centers in the three availability zones may be allocated in different flood plains and each possess dedicated utility and networking infrastructure with different utility suppliers, such that the data center(s) in one availability zone may be isolated from operative failures in the data center(s) in another availability zone within the same region. This provides the ability to operate production applications and databases that are more highly available, fault tolerant, and scalable than would be possible from a single data center. Further, because the regions are distributed in greatly dispersive locations, e.g., around the world, the probability to have an accident simultaneously affecting the operations of multiple regions may be greatly reduced. In some embodiments, the regions of the service provider network may be connected with each other via inter-region networks. In some embodiments, the inter-region networks may include wide-area networks, e.g., a private network system owned by the service provider, a public network system provided by a third-party Internet service provider (ISP), or a combination of the two. In some embodiments, the availability zones within one region may connected through, e.g., low-latency network links.

In some embodiments, the service provider network may receive, e.g., in a region (a "receiving region"), a request from a client to create multiple replicas of a service resource in respective instantiations of a service in different regions. For instance, the client may maintain a database including, e.g., a table, for a large user base across a first and a second regions. To satisfy this use case, the client may need to create two identical replicas of the table respectively in the respective instantiations of a database services in the first and second regions. The database service of the service provider network may automatically replicate data changes among those replicas so that changes to records in one replica in one region would seamlessly propagate to the other region. Thus, when one region were to become unavailable, the same records may be still accessed in the other region. It may be desirable to have capacity management of the resources of the service provider network in the global regions. For instance, it would not be ideal to accept the request from the client, discover that the regions do not have sufficient capacities to serve the request, and then inform the client that the request is denied. Instead, it may be more appropriate to accept the request based on the regions' capacities. Thus, in some embodiments, the "receiving region" (e.g., the first region) may send requests to determine whether the regions have the necessary capacity as to serving the replica of the service resource in the respective instantiation of the service in the regions. The receiving region may determine whether it has the sufficient resource capacity to create a (local) replica of the service resource in the instantiation of the service in the first region. The receiving region may further send the request to the second region to determine whether the second region can create the second (or remote) replica of the service resource in the instantiation of the service in the second region. Here, the service may broadly refer to a storage service, a computing service, a media streaming service, an e-mail service, a networking service, and the like that may be offered by a service provider network, and the service resource may signify various records, data and/or applications hosted in corresponding instantiations of the service of the service provider network. For instance, when the request from the client to create replicated tables in the first and second regions is received at the control plane of a first region, the control plane of the first region may send requests to the first and second regions to determine whether the first and second regions have sufficient storage resources to store the table. Alternatively, when the request is to host duplicate instances of an application, the first region may send requests to the first and second regions to determine whether the first and second regions have sufficient computing resources to create the instances in the respective instantiations of a computing service. In some embodiments, in response to the requests, the regions may respectively examine their resources and capacities and provide the information to the receiving region. For instance, the first and second regions may each include a capacity management system. In response to the requests, the capacity management systems in the two regions may be invoked to inspect the status of the resources and respective capacities with respect to serving the replicas of the service resource in the respective instantiation of the service. In some embodiments, based on the determined capacities of the regions, the first region may provide a response to the client. For instance, the response may indicate whether the client's request can be accepted (or served) or not, e.g., depending on whether the regions have the capacities to host the service resource or not. Herein, because the first region first determines the capacities and then provides the response, this may be referred to as an asynchronous capacity management mode because the client does not receive the response immediately, i.e., at or near the moment when the response received by the first region. In some embodiments, once it is determined that the regions possess the necessary capacities to serve the request, the first region may request the regions to provision resources including, e.g., reserving, configuring and providing the client access to appropriate storage, computing and networking resources of the corresponding services, to serve the respective replicas of the service resource. For instance, an application programming interface (API) may be invoked in the first and second regions respectively to prepare and launch resources to host the respective replicas of the service resource. Thus, the client's request may be fulfilled in two phases—(1) a prepare phase to determine the capacities and (2) a commit phase to serve the request. In some embodiments, when it is determined that at least one of the regions does not have the sufficient capacity for creating the replica of the service resource, the first region or receiving region may be refrained from sending a corresponding command(s) to the other region(s) to provision resources for hosting the replica(s). Alternatively, the first region or receiving region may send a refraining command(s) to the other region(s) to prevent the other region(s) from provisioning resource for the replica(s). In some embodiments, the service provider network may implement the capacity management in a synchronous mode. For instance, the first region may provide an initial response to the client immediately, i.e., at or near the point-in-time when the client's request is received by the first region. For instance, the initial response may indicate that the request is received by the service provider network. In another example, besides merely an acknowledgement, the initial response may indicate that the client's request is pending and being processed and that the client may need to follow up with the service provider network (e.g., through customer services of the service provider network) to complete the request. In some embodiments, the first region may further determine the capacities of the regions to create the replicas of the service resource. Based on the determined capacities of the regions, the first region may provide an updated response to the client. For example, the updated response may further indicate whether the client's request is accepted or not.

One skilled in the art will appreciate that the techniques disclosed herein may be capable of providing technical advantages, including: (1) improving the resource management of a service provider network in multiple regions, especially, across world-wide areas, (2) improving customer experience by accepting requests with assurance of resource capacities, (3) reducing erroneous demands on the service provider network due to a delayed discovery of insufficient capacities, and (4) providing timely alerts to the service provider network to add and/or procure resources.

In some embodiments, the client may specify a time window in the request for the service provider network to provide the response. When the service provider network fails to provide the response within the time window, the client's request may be considered denied by default. In some embodiments, the service provider network may automatically generate a denial response to the client subsequent to expiration of the time window. In some embodiments, the client may specify a policy to the service resource in the request for users in different regions to access the service resource. For instance, the client may request creating three replicas of a database including, e.g., a table, in the U.S. East Region, Asia Pacific Region and Europe region. The client may further specify that user A may only access the tables in the U.S. East and Asia Pacific regions whilst user B may have access to the tables only in the Asia Pacific and Europe regions. In some embodiments, the capacity management may be implemented for different types of services offered by the service provider network. Accordingly, the capacity management for different services may assess different types of resources corresponding to different services of the service provider network for determining the required capacities of the regions. For instance, when the client's request relates to a global storage service, as described above, the capacity management may focus on the storage resources of different regions in order to determine whether they have the capacities to create the respective replicas of a data item in respective instantiations of the global storage service in the different regions. In another example, when the client requests for a computing service, the capacity management may evaluate the computing (and maybe networking) resources when determining the capacities in different regions.

In some embodiments, the service provider network may alternatively use the asynchronous and synchronous modes to implement the capacity management of the resources in the global regions. For instance, the service provider network may pre-store information, in the receiving region, of the reserved or buffered resources in the global regions. In some embodiments, the pre-stored information may be polled by the control plane of the receiving region from various regions, e.g., periodically. The reserved or buffered resources may be set aside ahead of time, e.g., according to some policies, for emergency or ancillary service requests. When the service provider network receives the request from the client in the receiving region, it may evaluate the size of the required resources of the request versus the reserved or buffered resources in the different regions. When the regions may serve the requests with the reserved or buffered resources, the service provider network may provide a response to the client immediately, thus in a synchronous mode. Conversely, when the required resources exceed the capacities of the reserved or buffered resources, the service provider network may rely on the asynchronous mode—to first determine the capacities of the regions and then provide the response to the client.

In some embodiments, the service provider network may provide a response to the client which indicates that the request may be accepted but with a time delay or an estimated time when the replica will arrive or become available (a confirmation or later indication that the resource is ready may be provided when the replica is created and available). This may occur when a region determines that it has the capacity but ensuring the resources are available may take a delay. For instance, the region may have to take 20 minutes to release one or more resources to make the required capacity available. In some embodiments, the determination that a region does not have the capacity to serve the replica of the service resource may further trigger resource allocation and/or addition actions. For instance, an API call may be invoked in the corresponding region to create an alert or inquiry to release idle resources and/or procure additional resources. In some embodiments, the response to the client may require the client to take further follow-up action to fulfill the request. For instance, the response may include a phone number of the customer services and request the client to contact the customer services to verify the capacities and fulfill the request. In some embodiments, the client may indicate one or more specific regions in the request for serving the replicas of the service resource. For instance, the client may specify two regions among 16 regions of the service provider network to store a table. In that case, the receiving region may only need to determines the capacities of the two specific regions rather than all the global regions. This may reduce the time delay for the receiving region to provide the response to the client.

FIG. 1 is a block diagram showing an example service provider network with resource capacity management, according to some embodiments. In this example shown in FIG. 1, service provider network 100 may be implemented based a plurality of computing devices to offer various network-based services, e.g., storage services, computing services, media streaming servicing, e-mail services, networking services, etc., across multiple regions world-wide. In this example shown in FIG. 1, the services may be deployed as respective instantiations across regions 110, 115 and 120. Regions 110, 115 and 120 may each include a plurality of distinct locations or availability zones. For instance, region 110 may include availability zones 1A, 1B, and 1C, region 115 include availability zones 2A and 2B, and region 120 include availability zones 3A and 3B. Each availability zone 1A-1C, 2A-2B and 3A-3B may consist of a plurality of data centers. As described above, the data centers may be equipped with dedicated utility and networking infrastructure such that one data center in one availability zone may be isolated from operative failures in another data center in another availability zone in the same region. For instance, the data center(s) in availability zone 1A-1C may be allocated to separate flood plains with different utility suppliers. Thus, an operative failure in the data center(s) in availability zone 1A would not impact or interrupt operations of the data center(s) in availability zones 1B and 1C. In some embodiments, the data centers in different availability zones in the same region may be connected, e.g., through low-latency links. In some embodiments, regions 110, 115 and 120 may also be connected with inter-region networks, e.g., a private network system, a public network system, or a combination of the two. In some embodiments, each region 110, 115 and 120 may include a respective control plane (e.g., control planes of regions #1, #2 and #3, respectively) that may assist the operations of the data centers in respective regions 110, 115 and 120. In some embodiments, the individual control planes in regions 110, 115 and 120 may include a capacity management system to implement resource management for respective regions 110, 115 and 120.

In some embodiments, client 105 may access the global services offered by service provider network 100 via network 125. For instance, client 105 may submit request 135 to region 110 to create three replicas of a service resource in respective instantiations of a service in regions 110, 115, and 120. The service resource may be associated with an instantiation of a storage service, a computing service, a media streaming services, an e-mail service, a networking services, etc. offered by service provider network 100. In response to request 135, region 110 may determine the capacities of regions 110, 115 and 120 as to serving the respective replicas of the service resource. For instance, besides an "internal" request to itself, the control plane of region 110 may submit requests 140 and 145 to control planes of regions 115 and 120 respectively. The control planes of regions 110, 115 and 120 may use the respective capacity management systems to determine whether the respective regions can create the replicas of the service resource in respective instantiations of the service. For instance, regions 110, 115 and 120 may each determine whether the data centers in the regions have the required resources (e.g., storage, computing, networking, etc.) to create the respective replicas of the service resource. In some embodiments, regions 110, 115 and 120 may determine whether any idle resources may be released and re-allocated for request 135. Regions 115 and 120 may return the capacity information to region 110, as indicated by 150 and 155. Based on the determined capacities of the regions, region 110 may provide response 160 to client 105, through network 125. As described above, the capacity management may be considered as an asynchronous mode. In some embodiments, when region 110 determines that regions 110, 115 and 120 possess the required capacities to serve the replicas of the service resource, the control plane region 110 may send requests 165 and 170 to the control plane of regions 115 and 120 to provision the resources to serve the replicas of the service resource. For instance, regions 110, 115, and 120 may create and store respective replicas of the table, or create and launch respective replicate instances of the application, in the regions. Thus, request 135 may be viewed as being served in two phases—(1) a prepare phase to determine the regions capacities and (2) a commit phase to serve the request. In some embodiments, when it is determined that at least one of the regions does not have the sufficient capacity for creating the replica of the service resource, region 110 or receiving region may be refrained from sending a corresponding command(s) to regions 115 and 120 to provision resources for hosting the replica(s). Alternatively, region 110 or receiving region may further send a refraining command(s) to regions 115 and 120 to prevent regions 115 and 120 from provisioning resource for the replicas. Note that besides the above described coordination between the three regions to create service resources in multiple regions, the individual control planes (and/or capacity management systems) of regions 110, 115 and 120 may be also responsible for managing resources for hosting a service resource in a local service in the respective regions alone (i.e., rather than in multiple regions). For instance, the local service may correspond to a specific computing service offered by the service provider network only in region 110. In this case, the control plane of region 110 may be responsible for creating service resources in this specific computing service, besides coordinating with the control planes of regions 115 and 120 to create service resources in other instantiations of services (e.g., a global service) in regions 110, 115 and 120.

In some embodiments, the capacity management may be implemented in a synchronous mode. For instance, in response to request 135, region 110 may provide initial response 160 immediately to client 105. In some embodiments, the initial response may indicate an acknowledgement that request 135 is received by service provider network 100. In another example, besides merely an acknowledgement, initial response 160 may indicate that the client's request is pending and being processed and that client 105 may need to follow up with service provider network 100 to complete the request. In some embodiments, region 110 may further determines the capacities of regions 110, 115 and 120 as to serving the respective replicas of the service resource, as described above. Based on the determines capacities of the regions, region 110 may provide updated response 160 to client 105. In some embodiments, the updated response may indicate whether or not request 135 is accepted or can be served by service provider network 100. Similarly, when region 110 determines that regions 110, 115 and 120 possess the capacities to serve the respective replicas of the service resource, region 110 may send further request, e.g., as indicated by requests 165 and 170, to regions 110, 115 and 120 to provision resources to serve the replicas of the service resource.

In some embodiments, client 105 may specify a time window in request 135 for service provider network 100 to provide response 160. When service provider network 100 fails to provide response 160 to within the time window, request 135 may be considered denied by default. In some embodiments, service provider network 100 may automatically generate denial response 160 to client 105 subsequent to expiration of the time window. In some embodiments, client 105 may specify a policy to the service resource in request 135 for users in different regions to access the service resource. For instance, client 105 may request creating three replicas of the table in regions 110, 115 and 120. Client 105 may include a policy in request 135 specifying that user A (of client 105 with respect to the table) may only access the tables in regions 110 and 115 whilst user B (of client 105) may have access to the tables only in regions 115 and 120.

In some embodiments, service provider network 100 may alternatively use the asynchronous and synchronous modes to implement the capacity management of the resources in regions 110, 115 and 120. For instance, service provider network 100 may pre-store information, in region 110, of the reserved or buffered resources in regions 110, 115 and 120. In some embodiments, the pre-stored information may be polled (e.g., periodically) by service provider network 100 from and stored in regions 110, 115 and 120. The reserved or buffered resources may be set aside, e.g., ahead of time according to some policies, for emergency or ancillary service requests. When service provider network 100 receives request 135 from client 105 in region 110, the data centers in region 110 may evaluate the size of the required resources for request 135 versus the reserved or buffered resources in regions 110, 115 and 120. When regions 110, 115 and 120 may be able to serve the requests with the reserved or buffered resources, region 110 may provide response 160 to client 105 immediately, thus in a synchronous mode. Conversely, when the required resources exceed the capacities of the reserved or buffered resources, region 110 may rely on the asynchronous mode—to first determine the capacities of regions 110, 115 and 120 and then provide response 160 to client 105.

In some embodiments, service provider network 100 may provide response 160 to client 105 which may indicate that request 135 may be accepted but with a time delay or an estimated time when the replica will arrive or become available (a confirmation or later indication that the resource is ready may be provided when the replica is created and available). For instance, region 115 may reply to region 110 indicating that region 115 may have to take 20 minutes to release one or more resources to make the required capacity available. In some embodiments, the determination that a region does not have the capacity to serve the replica of the service resource may further trigger resource allocation and/or addition actions. For instance, when it is determined that region 120 does not have the capacity as to serving the replica, an API call may be invoked in region 120 to create an alert or inquiry to release idle resources and/or procure additional resources. In some embodiments, response 160 to client 105 may require client 105 to take further follow-up action to fulfill the request, as described above. For instance, response 160 may include a phone number of the customer services of service provider network 100 and request client 105 to contact the customer services to complete request 135. In some embodiments, client 105 may indicate one or more specific regions in request 135 for serving the replicas of the service resource. For instance, client 105 may specify regions 110 and 115 from the three regions of service provider network 100 to store a table. Accordingly, region 110 may only need to determines the capacities of the two specific regions, e.g., regions 110 and 115, rather than all the three regions. In some embodiments, the specified regions may not necessarily include the receiving region. For instance, although request 135 is originally received by service provider network 100 in region 110, request 135 may instead specify regions 115 and 120 to host two replicas of a service resource in respective instantiations of a service of service provider network 100.

Figure 2:
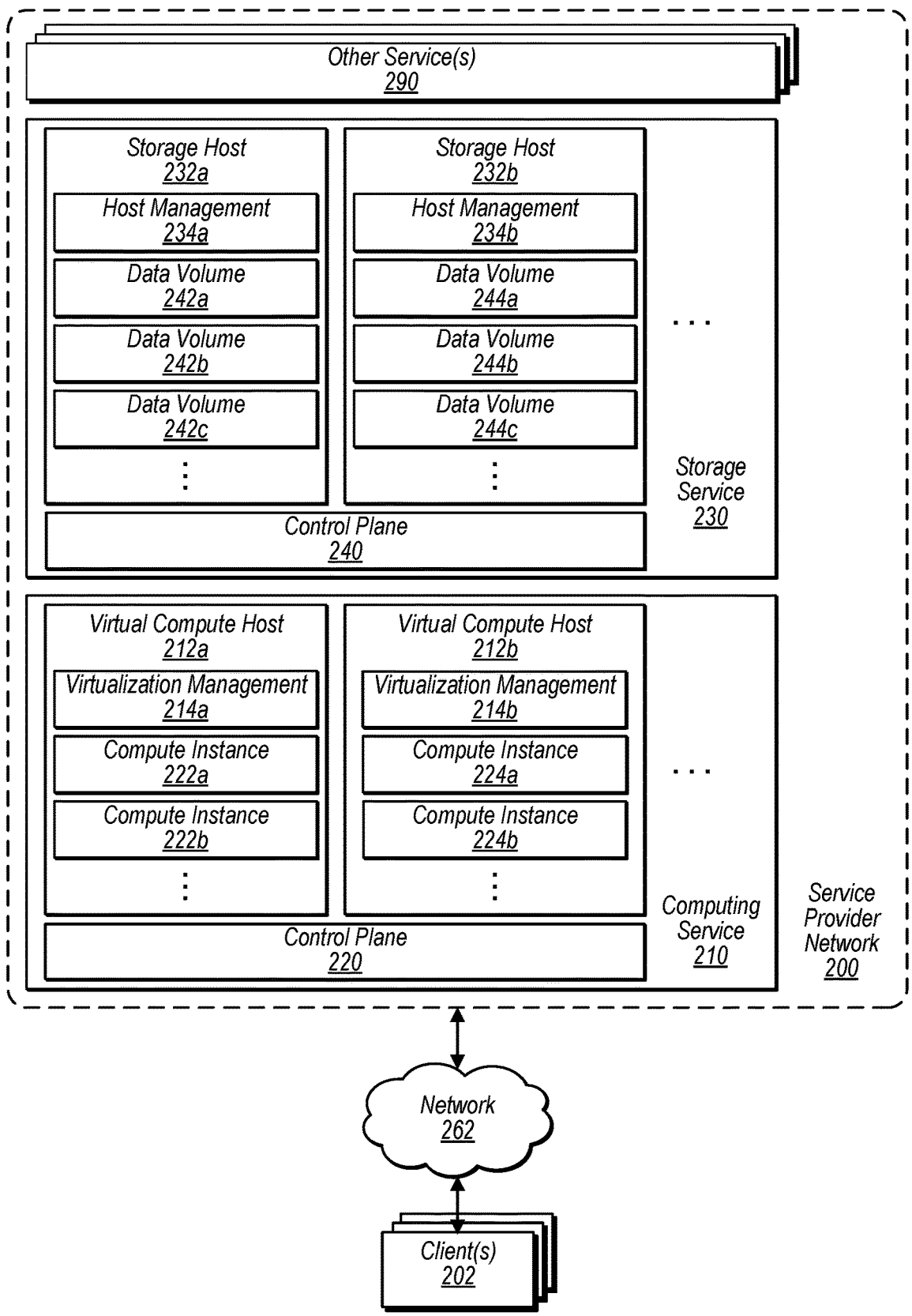
FIG. 2 is a block diagram showing a logic structure of an example service provider network in a region, according to some embodiments.

FIG. 2 is a block diagram showing a logic structure of an example service provider network in a region, according to some embodiments. In the example shown in FIG. 2, service provider network 200 may be a cloud provider network (sometimes referred to simply as a "cloud"), which refers to a large pool of network-accessible computing resources (such as compute, storage, and networking resources, applications, and services), which may be virtualized or baremetal. The cloud may provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Service provider network 200 may be set up by an entity such as a company or a public sector organization to provide one or more services (such as various types of cloud-based or other network-based computing or storage) accessible via the Internet and/or other networks to clients 202. For instance, service provider network 200 in the region may include numerous data centers hosting various resource pools, such as collections of physical and/or virtualized computer servers, storage devices, networking equipment and the like, needed to implement and distribute the infrastructure and services offered by the service provider network 200. As described the numerous data centers in the region may be allocated at multiple distinct locations, e.g., available zones to achieved required level of resilience and fault-tolerance. In some embodiments, service provider network 200 may provide computing resources. These computing resources may in some embodiments be offered to clients in units referred to as "compute instances" or "instances," such as compute instances 222a, 222b and 224a, 224b. In some embodiments computing resources may be containers, which package up code and all its dependencies so an application (also referred to as a task) can run quickly and reliably from one computing environment to another. Likewise, in some embodiments, service provider network 200 may provide storage resources, which may be offered to clients in units called data volumes, 242a, 242b, 242c and 244a, 244b, 244c, which may be virtual or physical block-based storage volumes.

Computing service 210 may offer instances 222 and 224 according to various configurations for client(s) 202 operation. Instances 222 and 224 may host individual replicas of a service resource. Compute instance 222 and 224 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement compute instances 222 and 224 of service provider network 200 in different embodiments, including general purpose or special purpose computer servers, storage devices, network devices and the like. In some embodiments, instance client(s) 202 or other any other user may be configured (and/or authorized) to direct network traffic to a compute instance 202.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client(s) 202 applications, without for example requiring client(s) 202 to access an instance. Applications (or other software operated/implemented by compute instances 222 and 224 may be specified by client(s) 202, such as custom and/or off-the-shelf software.

As illustrated in FIG. 2, a virtual compute host, such as virtual compute hosts 212a and 212b, may implement and/or manage multiple compute instances 222a, 222b, 224a, and 224b respectively, in some embodiments, and may be one or more computing devices, such as computing system 800 described below with regard to FIG. 8. Virtual compute hosts 212 may also provide multi-tenant hosting of compute instances. For example, in some embodiments, one virtual compute host may host a compute instance for one entity (e.g., a particular client or account of virtual computing service 210), while another compute instance hosted at the same virtual compute host may be hosted for another entity (e.g., a different account). A virtual compute host may include a virtualization management platform, such as virtualization management 214a and 214b capable of instantiating and managing a number of different client-accessible virtual machines or compute instances. Virtualization management 214 may include, for example, a hypervisor and an administrative instance of an operating system, which may be termed a "domain-zero" or "dom0" operating system in some implementations. The "dom0" operating system may not be accessible by clients on whose behalf the compute instances run, but may instead be responsible for various administrative or control-plane operations of the network provider, including handling the network traffic directed to or from the compute instances. In some embodiments, virtual compute hosts 212a and 212b may be individually implemented based on the resources the data centers in one available zone. Alternatively, in some embodiments, virtual compute hosts 212a and 212b may be individually implemented on the resources the data centers collectively in multiple available zones within the same region. In some embodiments, service provider network 200 may create replicas of a service resource, on the level of the availability zone, in the region to further enhance data availability and reliability. For instance, although multiple replicas of the service resource have been created in multiple regions of service provider network 200, service provider network 200 in the region shown in FIG. 2 may further create multiple replicas of the service resource, one for each availability zone of the region.

Virtual computing service 210 may implement control plane 220 to perform various management operations. For instance, control plane 220 may implement resource management to manage the access to, capacity of, mappings to, and other control or direction of compute instances offered by service provider. In some embodiments, the data centers in the region of service provider network 200 may utilize control plane 220 to receive the request(s) from client(s) 202 associated with service resources for computing service 210. In some embodiments, control plane 220 of service provider network 200 may be addressable to client(s) 202 in the form of an endpoint or a uniform locator link (URL). Client(s) 202 may access service provider network 200 (or control plane 220) by visiting the endpoint or URL through various (e.g., HTTP or HTTPS) protocols. In some embodiments, control plane 220 of a receiving region may obtain information of computing resources of service provider network 200 in the region and accordingly assess the capacity of the region as to serving the replica of the service resource in the receiving region. In some embodiments, control plane 220 in the receiving region may communicate with control plane(s) 220 of the other region(s) of service provider network 200 to determine the capacities of the other region(s). In some embodiments, control plane 220 may provide response(s) to client(s) 202 based on the determined capacities of the regions. In some embodiments, when it is determined that the regions have the capacities to serve the respective replicas of the service resource, control plane 220 may further instruct the regions to provision the computing resources to serve the respective replicas of the service resource. In some embodiments, when it is determined that a region does not possess the capacity to serve a replica of the service resource, control plane 220 of the corresponding region may invoke resource release and/or additional operations, e.g., through an API call.

In some embodiments, service provider network 200 may also implement virtual block-based storage service 230 for offering block-based storage with the performance advantages of scalability, durability, and varying levels of automated maintenance or management. Virtual block-based storage service 230 is a storage system, composed of a pool of multiple independent storage hosts, such as storage hosts 232a and 232b, which provide block level storage for storing one or more sets of data volumes, such as data volume 242a, 242b, 242c, and 244a, 244b, 244c. Data volumes 242 and 244 may be attached to one or multiple client(s) (e.g., a virtual compute instance of virtual compute service 210), providing virtual block-based storage (e.g., virtual hard disk storage or other persistent storage) as a contiguous set of logical blocks. For example, in some embodiments, compute instances 224 may mount, attach, map or otherwise connect to one or more data volumes 242 and/or 244 provided by virtual block-based storage service 230 in order to obtain persistent block-based storage for performing various operations.

Storage hosts 232a and 232b may be one or more computing systems or devices, such as one or more storage servers or other computing systems (e.g., computing system 800 described below with regard to FIG. 8) implementing storage devices, such as hard disk storage devices, flash-based (or other non-volatile storage devices), or any other block-based storage devices that may persistently store data volumes, in some embodiments. Each storage host may maintain respective replicas of data volumes. Some data volumes may differ in size from other data volumes, in some embodiments. Storage hosts may also provide multi-tenant storage. For example, in some embodiments, one storage host may maintain a data volume for one entity (e.g., a particular client or account of block-based storage service 230), while another data volume maintained at the same storage host may be maintained for another entity (e.g., a different account). Storage hosts may persist their respective data volumes in one or more block-based storage devices (e.g., hard disk drives, solid state drives, etc.) that may be directly attached to a computing system or device implementing the respective storage host. Storage hosts may implement different persistent storage devices. For example, some storage hosts may implement solid state drives (SSDs) for persistent block storage, while other storage hosts may implement hard disk drives (HDDs) or other magnetic-based persistent storage devices. In this way different volume types, specifications, and other performance characteristics may be provided according to the persistent storage devices implemented at the storage host. In some embodiments, storage hosts 232a and 232b may be individually implemented based on the resources the data centers in one available zone. Alternatively, in some embodiments, storage hosts 232a and 232b may be individually implemented on the resources the data centers collectively in multiple available zones within the same region.

Data may be maintained in data volumes 242, 244 in such a way as to provide security and privacy guarantees for client(s) 202. Host management 234a may enforce access policies for individual data volumes, limiting access to data in data volumes to those requestors that satisfy the access policy (e.g., by presenting appropriate identification or credentials). In this way, data stored in different data volumes on the same storage host for different clients may be confidentially maintained so that an unauthorized request to access data may not be processed (even if the requestor has the right to access another data volume hosted at the same storage host).

Storage service 230 may implement control plane 240 to assist in the operation of storage service 230. In some embodiments, control plane 240 assists in managing the availability of block data storage to clients, such as programs executing on compute instances provided by virtual compute service 210 and/or other network-based services 290 located within service provider network 200 and/or optionally computing systems (not shown) located within one or more other data centers, or other computing systems external to service provider network 200 available over a network 262. Access to data volumes 242, 244 may be provided over an internal network within service provider network 200 or externally via network 262, in response to block data transaction instructions.

Control plane 240 may provide a variety of services related to providing block level storage functionality, including the creation, usage and deletion of data volumes 242, 244 in response to configuration requests. In some embodiments, the data centers in the region of service provider network 200 may utilize control plane 240 to receive the request(s) from client(s) 202 associated with service resources for storage service 230. In some embodiments, control plane 240 of service provider network 200 may be addressable to client(s) 202 in the form of an endpoint or a uniform locator link (URL). In some embodiments, it may be the same endpoint or URL as to the endpoint or URL associated with control plane 220 as described above. Client(s) 202 may access service provider network 200 (or control plane 224) by visiting the endpoint or URL through various (e.g., HTTP or HTTPS) protocols. In some embodiments, control plane 240 of a receiving region may obtain information of storage resources of service provider network 200 in the region and accordingly assess the capacity of the region as to serving the replica of the service resource in the receiving region. In some embodiments, control plane 240 in the receiving region may communicate with control plane(s) 240 of the other region(s) of service provider network 200 to determine the capacities of the other region(s). In some embodiments, control plane 240 may provide response(s) to client(s) 202 based on the determined capacities of the regions. In some embodiments, when it is determined that the regions have the capacities to serve the respective replicas of the service resource, control plane 240 may further instruct the regions to provision the storage resources to serve the respective replicas of the service resource. In some embodiments, when it is determined that a region does not possess the capacity to serve a replica of the service resource, control plane 240 of the corresponding region may invoke resource release and/or additional operations, e.g., through an API call. For purposes of illustration, in FIG. 2, service provider network 200 in the region may include separate control planes for different services. For instance, service provider network in FIG. 2 may include control plane 220 for computing service 210 and control plane 240 for storage service 230. In some embodiments, control planes 220 and 240 may be combined into one single control plane for service provider network 200. The single control plane may provide the above-described functionalities for computing service 210, storage service 230, and other service(s) 290 of service provider network 200. Accordingly, service provider network 200 may have one single endpoint or URL for each region, through which client(s) 202 may access the various services (e.g., computing service 210, storage service 230, and other service(s) 290) offered by service provider network 200 in the region.

Clients 202 may encompass any type of client configurable to submit requests to service provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance. Client(s) 202 may be associated with particular user accounts, user identifiers, or other information which may indicate the access rights, resources, and other associated information maintained at service provider network 200 on behalf of a client 202.

Clients 202 may convey network-based services requests to service provider network 200 via external network 262. In some embodiments, external network 262 may encompass any suitable combination of networking hardware and protocols necessary to establish network-based communications between clients 202 and service provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given client 202 and service provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and service provider network 200. It is noted that in some embodiments, clients 202 may communicate with service provider 202 using a private network rather than the public Internet.

Figure 3:
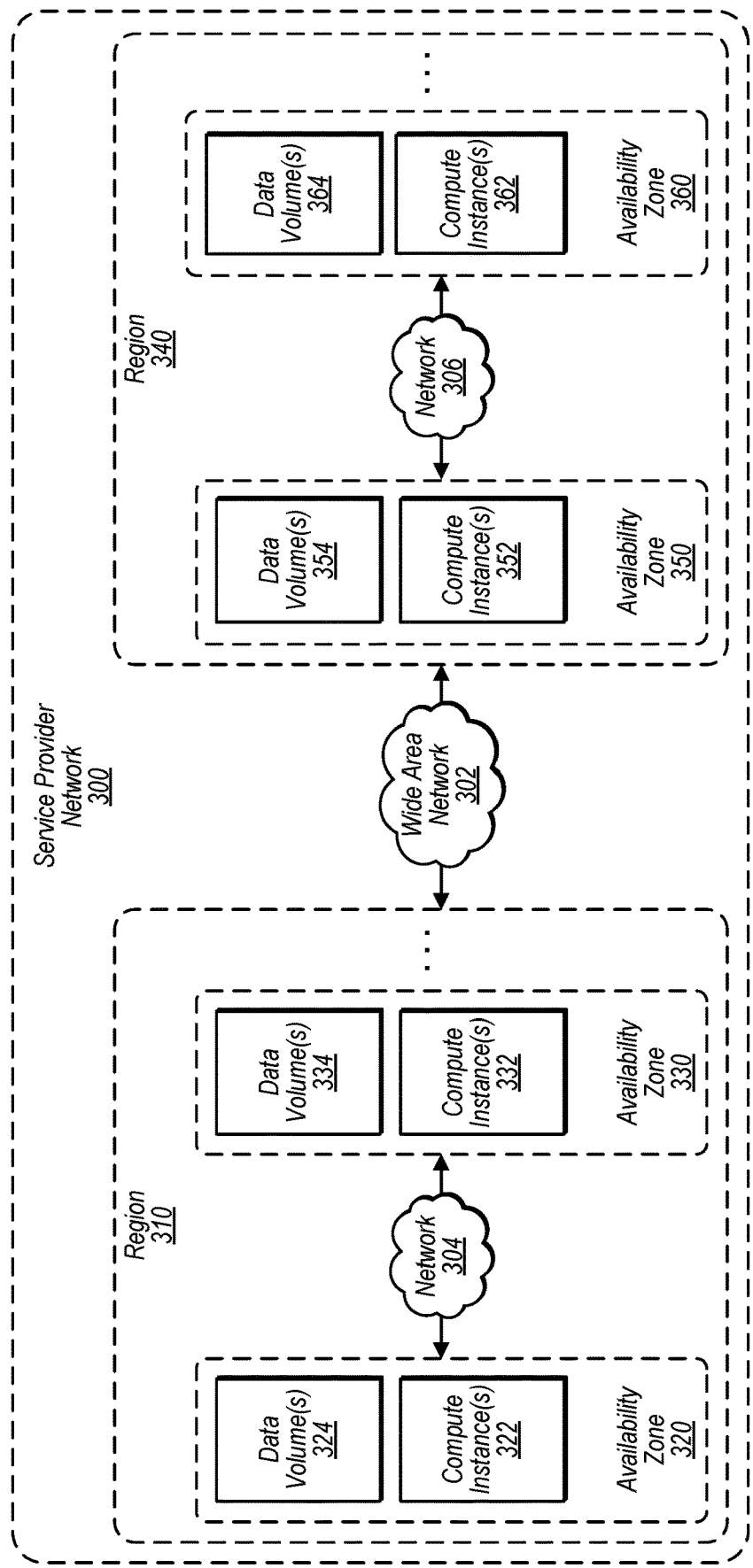
FIG. 3 is a block diagram showing an example resource allocation for a service provider in different regions, according to some embodiments.

As noted above, regions and availability zones may be operated independently from each other to achieve desired levels of availability, fault-resilience and performance. FIG. 3 is a block diagram showing an example resource allocation for a service provider in different regions, e.g., nationally or globally, according to some embodiments. For example, service provider network 300 may offer different regions, such as regions 310 and 340. Each region may be a geographic area, in some embodiments, which may offer best performance for external clients, systems, or devices within the geographic area. For example, a user located in region 310 may receive best performance when utilizing an application implemented in region 310 of service provider network 300 that is proximate the user. In some embodiments, the client may identify regions nearest users of applications implemented in service provider network 300 to provide a best performance location for the application.

Communications between regions (or from other external systems) may be sent via a wide area network 302 (e.g., the Internet). In some embodiments, private network communications may not be supported between region 310 and 340, in some embodiments (although encryption or other security features could be implemented to protect information traversing between the regions in wide area network 302). Within a region, however, communications may traverse private networks, such as networks 304 and 306. For instance, compute instance 322 hosted in availability zone 320 may send a communication to compute instance 332 via a private network 304 of service provider network 300, even though compute instances 322 and 332 are located in different availability zones, 320 and 330 within region 310. A region may implement multiple availability zones (e.g., availability zones 320 and 330 in region 310 and availability zones 350 and 360 in region 340). Each availability zone may implement its own various resources, such as data volume(s) 324 and compute instance(s) 322 in availability zone 320, data volume(s) 334 and compute instance(s) 332 in availability zone 330, data volume(s) 354 and compute instance(s) 352 in availability zone 350, and data volume(s) 364 and compute instance(s) 362 in availability zone 360. In some embodiments, multi-zone resources, such as a multi-zone volume, may be implemented within the availability zones of a single region.

Figure 4:
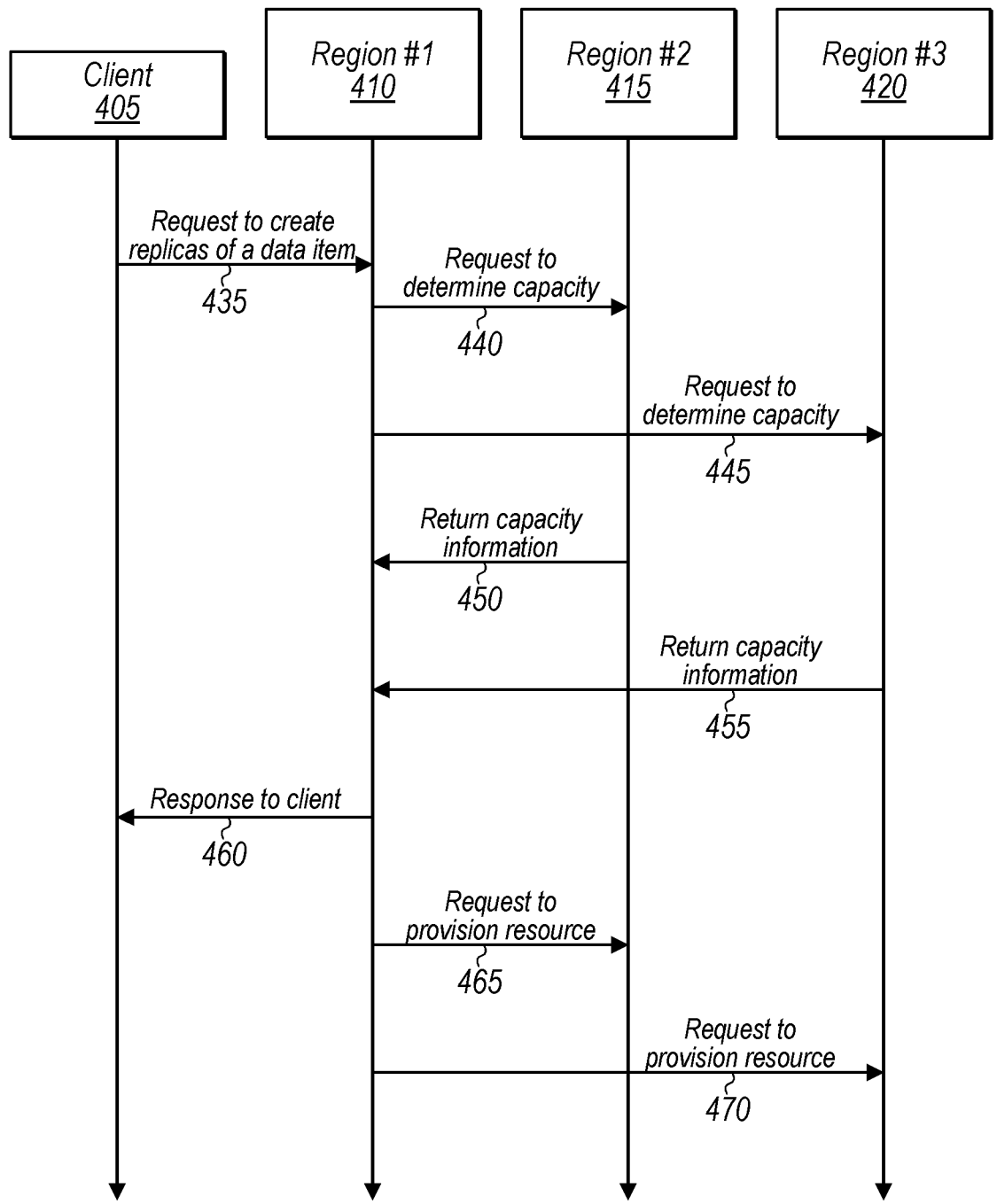
FIG. 4 is a block diagram showing example interactions to create replicas of a service resource in a service provider network in an asynchronous capacity management mode, according to some embodiments.

FIG. 4 is a block diagram showing example interactions to create replicas of a service resource in a service provider network in an asynchronous capacity management mode, according to some embodiments. In FIG. 4, the vertical edges may refer to time, whilst the horizontal edges may designate interactions between client and different regions. In this example shown in FIG. 4, request 435 from client 405 may be received by region #1, e.g., at control plane 410 of region #1. In some embodiments, request 435 may indicate creation of multiple replicas of a service resource respectively in multiple regions. For instance, request 435 may request three replicas of a table to be stored in respective instantiations of a database service in regions #1, #2, and #3. In some embodiments, in response to request 435, control plane 410 in region #1 may determine whether region #1 has the required resource capacity to serve the replica of the service resource, e.g., whether the data centers in region #1 has sufficient storage space for the table, by using a capacity management engine in region #1. In some embodiments, control plane 410 in region #1 may send requests 440 and 445 to regions #2 and #3, respectively. Requests 440 and 445 may be received by regions #2 and #3, e.g., at respective control planes 415 and 420. In some embodiments, regions #2 and #3 may individually have capacity management systems. In response to requests 440 and 445, control planes 415 and 420 may utilize the individual capacity management systems to evaluate the resource capacities of regions #2 and #3, respectively. Control planes 415 and 420 in regions #2 and #3 may return the capacity information to control plane 410 in region #1, as indicated by edges 450 and 455. Based on the determined capacities of the regions #1, #2 and #3, control plane 410 in region #1 may provide response 460 to client 405. As described above, response 460 may indicate various response information, e.g., acceptance or denial of request 435 with or without a time delay. In some embodiments, when it is determined that data centers in regions #1, #2, and #3 have the required capacity to serve the replicas of the service resource, control plane 410 in region #1 may send requests 465 and 470 to control planes 415 and 420 in regions #2 and #3 to provision resources for respective replicas of the service resource.

Figure 5:
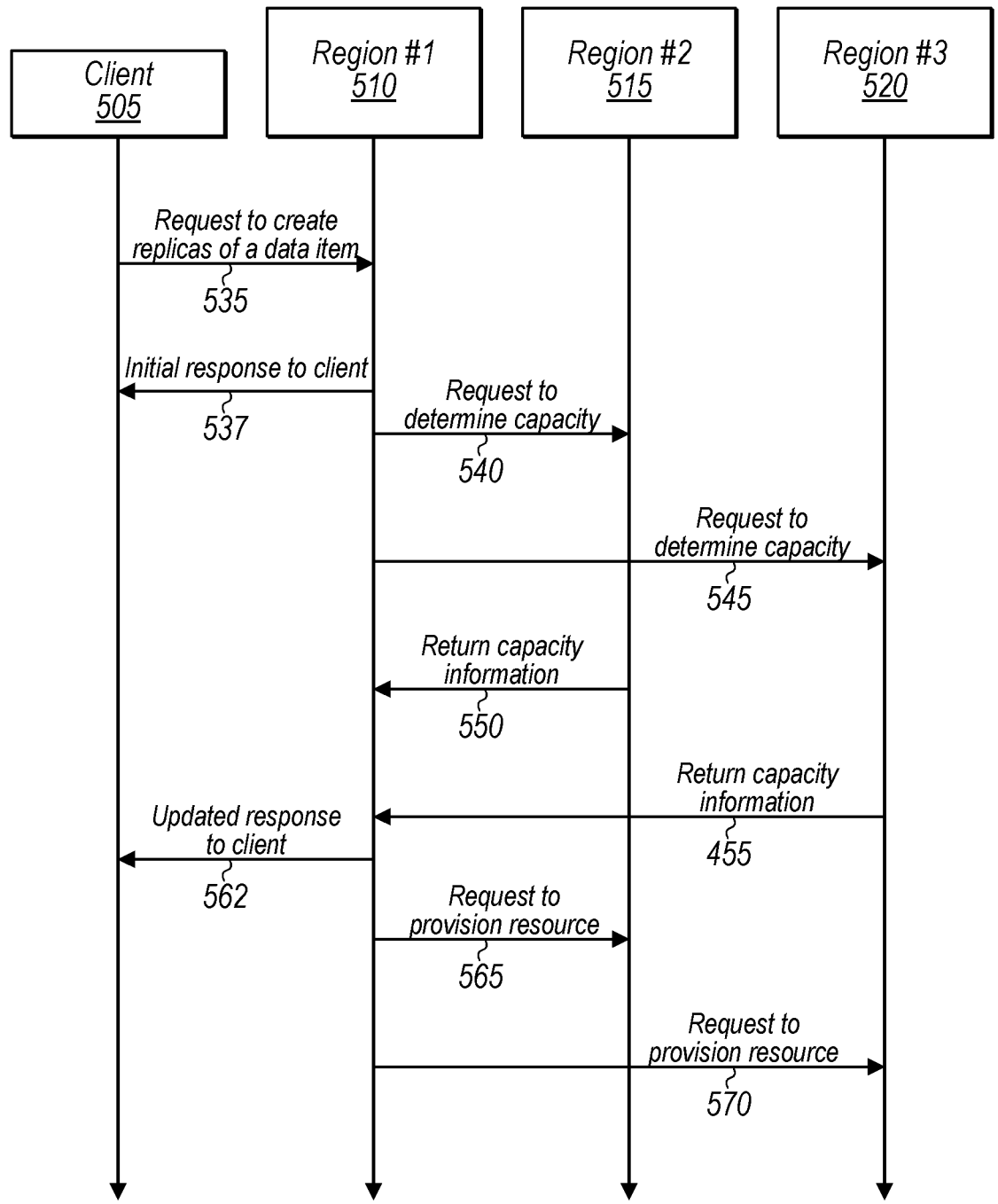
FIG. 5 is a block diagram showing example interactions to create replicas of a service resource in a service provider network in a synchronous capacity management mode, according to some embodiments.

FIG. 5 is a block diagram showing example interactions to create replicas of a service resource in a service provider network in a synchronous capacity management mode, according to some embodiments. In FIG. 5, the vertical edges may refer to time, whilst the horizontal edges may designate interactions between client and different regions. In this example shown in FIG. 5, request 535 from client 505 may be received by region #1, e.g., at control plane 510 in region #1. In some embodiments, request 535 may indicate creation of multiple replicas of a service resource respectively in multiple regions. For instance, request 535 may request three replicate instances of an application to be created in respective instantiations of a computing service in regions #1, #2, and #3. In some embodiments, in response to request 535, control plane 510 in region #1 may provide initial response 537 immediately to client 505, e.g., at or near the same time when control plane 510 receives request 535. In some embodiments, in response to request 535, control plane 510 in region #1 may further determine whether region #1 has the required resource capacity to serve the replica of the service resource, e.g., whether the database in region #1 has sufficient computing (and networking) instances to host the instance of the application, based on a capacity management system of region #1. In some embodiments, control plane 510 in region #1 may send requests 540 and 545 to regions #2 and #3, respectively. Requests 540 and 545 may be received by regions #2 and #3, e.g., at respective control planes 515 and 520. In some embodiments, regions #2 and #3 may individually have capacity management systems. In response to requests 540 and 545, control planes 515 and 520 may utilize the individual capacity management systems to evaluate the resource capacities of regions #2 and #3, respectively. control planes 515 and 520 of regions #2 and #3 may return the capacity information to control plane 510 in region #1, as indicated by edges 550 and 555. Based on the determined capacities of the regions #2 and #3, in combination of the capacity assessment of region #1, control plane 510 in region #1 may provide updated response 562 to client 505. Updated response 562 may update initial response 537 to client 505. For instance, initial response 537 may acknowledge receiving of request 535 by the service provider network in region #1, and updated response 562 may further indicate whether request 535 is accepted (or can be served) or denied by the service provider network, depending on whether or not control planes 510, 515 and 520 have the capacities to serve the replicas. Similarly, response 562 may indicate various information, e.g., the acceptance or denial of request 535 with or without a delay. In some embodiments, when it is determined that regions #1, #2, and #3 have the required capacity to serve the replicas of the service resource, e.g., the respective instantiations of the computing service in the regions have sufficient computing (and networking) resources for the respective replicate instances of the application, control plane 510 of region #1 may send requests 565 and 570 to control planes 515 and 520 of regions #2 and #3 to provision the resources for respective replicas of the service resource. Note that although FIGS. 4-5 illustrate the asynchronous and synchronous modes separately, in some embodiments, as described above, the service provider network may use both the asynchronous and synchronous modes alternatively to implement the capacity management. For instance, the service provider network may predetermine a resource threshold for the regions based on their reserved or buffered resources. Based on the evaluation of the resource requirement of the service resource with respect to the resource threshold, the service provider network may provide an immediate response to the client in a synchronous mode or a delayed response in an asynchronous mode.

Figure 6:
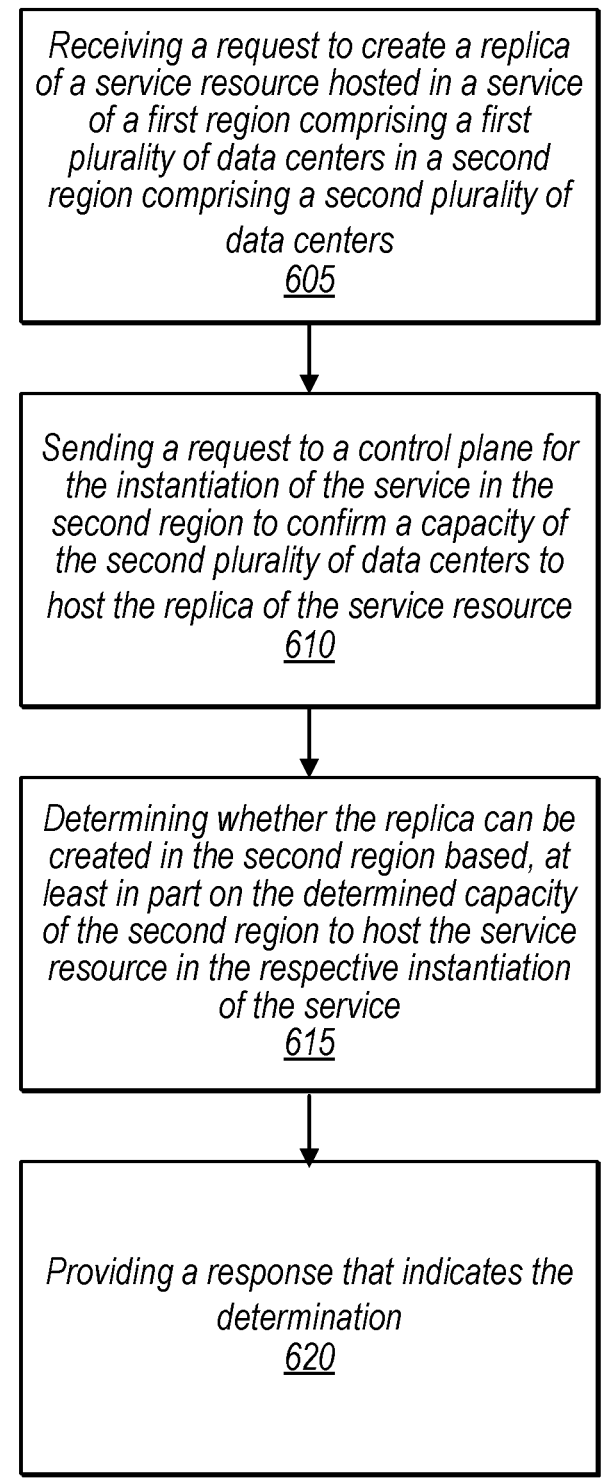
FIG. 6 is a flowchart showing an example operation to create replicas of a service resource in a service provider network in an asynchronous capacity management mode, according to some embodiments.

FIG. 6 is a flowchart showing an example operation to create replicas of a service resource in a service provider network in an asynchronous capacity management mode, according to some embodiments. In FIG. 6, a request from a client may be received by a service provider network, at the control plane of a first set of data centers in a first region of the service provider network (block 605). In some embodiments, the request may request to create a replica of a service resource hosted in a service of a first region comprising a first plurality of data centers in a second region comprising a second plurality of data centers. For instance, the request may request to create of a first and a second replicas of a table in a global database service (structured and/or unstructured) implemented by a first and a second sets of data centers allocated respectively in a first and a second regions. In another example, the request may indicate creations of a first and a second replicate instances of an application in a global computing service implemented by the first and second sets of data centers respectively in the first and second regions. In response to the request, the first region may send a request to the second region to confirm a capacity of the second region to host the replica of the service resource in the second region (block 610). For instance, the control plane for the first set of data centers in the first region may send a request to the control plane for the second set of data centers in the second region to invoke the capacity management system to determine the capacity of the second set of data centers in the second region for hosting the service resource. In response, the second set of data centers in the second region may return capacity information to the first set of data centers in the first region. Based on the information from the second region, the first region may determine whether the replica can be created in the second region based, at least in part on the determined capacity of the second region to host the service resource in the respective instantiation of the service (block 615). The first region may provide a response to the client to indicate the determination (block 620). For instance, when it is determined that the data centers in the regions have the capacities to serve the replicas, the response may indicate that the client's request is accepted. Conversely, when it is determined that one of the regions does not have the capacity, the response may indicate that the client's request is denied. In some embodiments, when it is determined that the regions have the capacities, the receiving region (e.g., the first set of data centers in the first region) may send requests to the first and second regions to provision resources to finish service of the replicas of the service resource. As described above, in some embodiments, the client may specify a time window in the request for the service provider network to provide the response. In some embodiments, the client may specify a user access policy for the replicas in different regions. As described above, in some embodiments, the response may include a time delay, an estimated time of service resource arrival or availability, or an indication for the client to take one or more follow-up actions. In some embodiments, when it is determined that at least one of the regions does not have the sufficient capacity for creating the replica of the service resource, the first region or receiving region may be refrained from sending a corresponding command(s) to the other region(s) to provision resources for hosting the replica(s). Alternatively, the first region or receiving region may send a refraining command(s) to the other region(s) to prevent the other region(s) from provisioning resource for the replica(s). In some embodiments, when it is determined that a region does not have the capacity to serve the replica, resource allocation and/or addition may be triggered for the corresponding region, e.g., via API calls.

Figure 7:
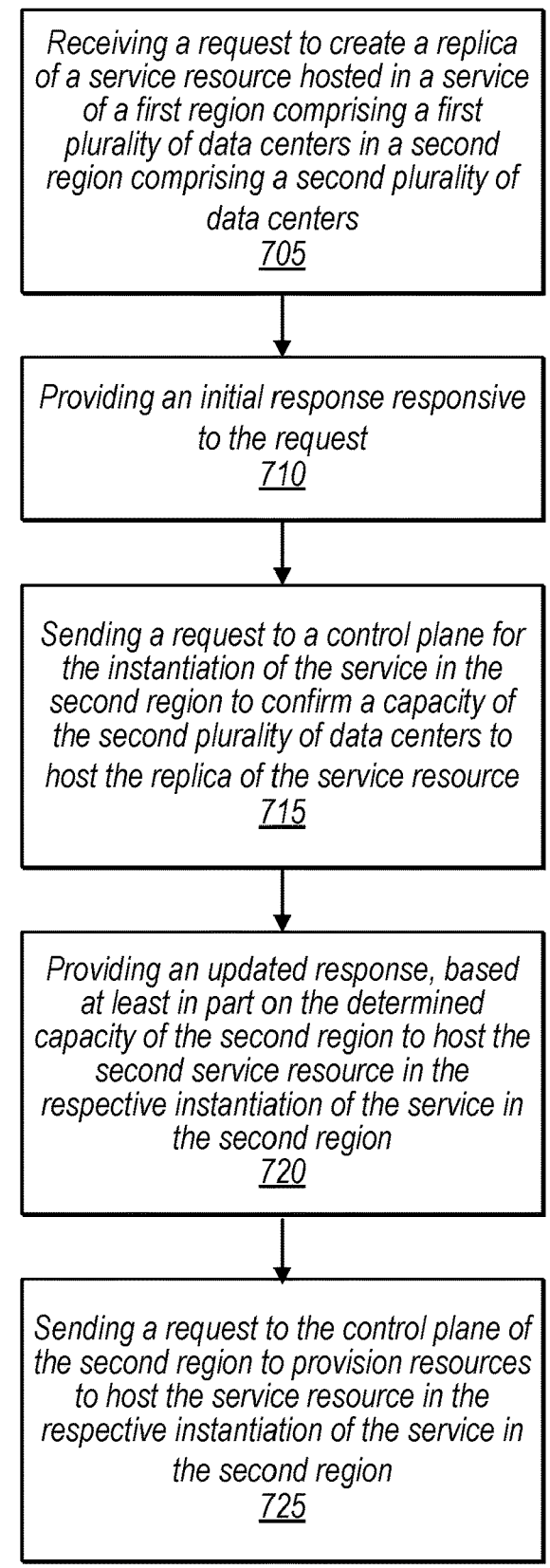
FIG. 7 is a flowchart showing an example operation to create replicas of a service resource in a service provider network in a synchronous capacity management mode, according to some embodiments.

FIG. 7 is a flowchart showing an example operation to create replicas of a service resource in a service provider network in a synchronous capacity management mode, according to some embodiments. In FIG. 7, a request from a client may be received by a service provider network, e.g., at the control plane for a first set of data centers in a first region of the service provider network (block 705). In some embodiments, the request may request to create a replica of a service resource hosted in a service of a first region comprising a first plurality of data centers in a second region comprising a second plurality of data centers. In response to the request, the control plane of the first region may provide an initial response to the client (block 710). For instance, the initial response may include an acknowledgement that the request is received by the service provider network. In another example, besides merely an acknowledgement, the initial response may indicate that the client's request is pending and being processed and that the client may need to follow up with the service provider network (e.g., through customer services) to complete the request. In some embodiments, the first region may send a request to the second region for the instantiation of the service in the second region to confirm a capacity of the second plurality of data centers to host the replica of the service resource (block 715). For instance, the control plane of the first region may send a request to the control plane of the second region to invoke the capacity management system to evaluate the resources and capacity of the second region. The first region may provide an updated response, based at least in part on the determined capacity of the second region to host the second service resource in the respective instantiation of the service in the second region (block 720). For instance, the updated response may indicate to the client whether the client's request to create the replicas of the service resource can be served. In some embodiments, when it is determined that the second region has the capacities to serve the replicas, the first region may send a request to the second region to provision resources to host the service resource in the respective instantiation of the service in the second region (block 725). In some embodiments, when it is determined that a region does not have the capacity to serve the replica, resource allocation and/or addition may be automatically triggered for that region. For instance, an API call may be invoked in the corresponding region to create an alert or inquiry to examine and release idle resources and/or procure additional resources. Note that although FIGS. 6-7 illustrate the asynchronous and synchronous modes separately, in some embodiments, the service provider network may alternatively use the asynchronous and synchronous modes to implement the capacity management, as described above.

Figure 8:
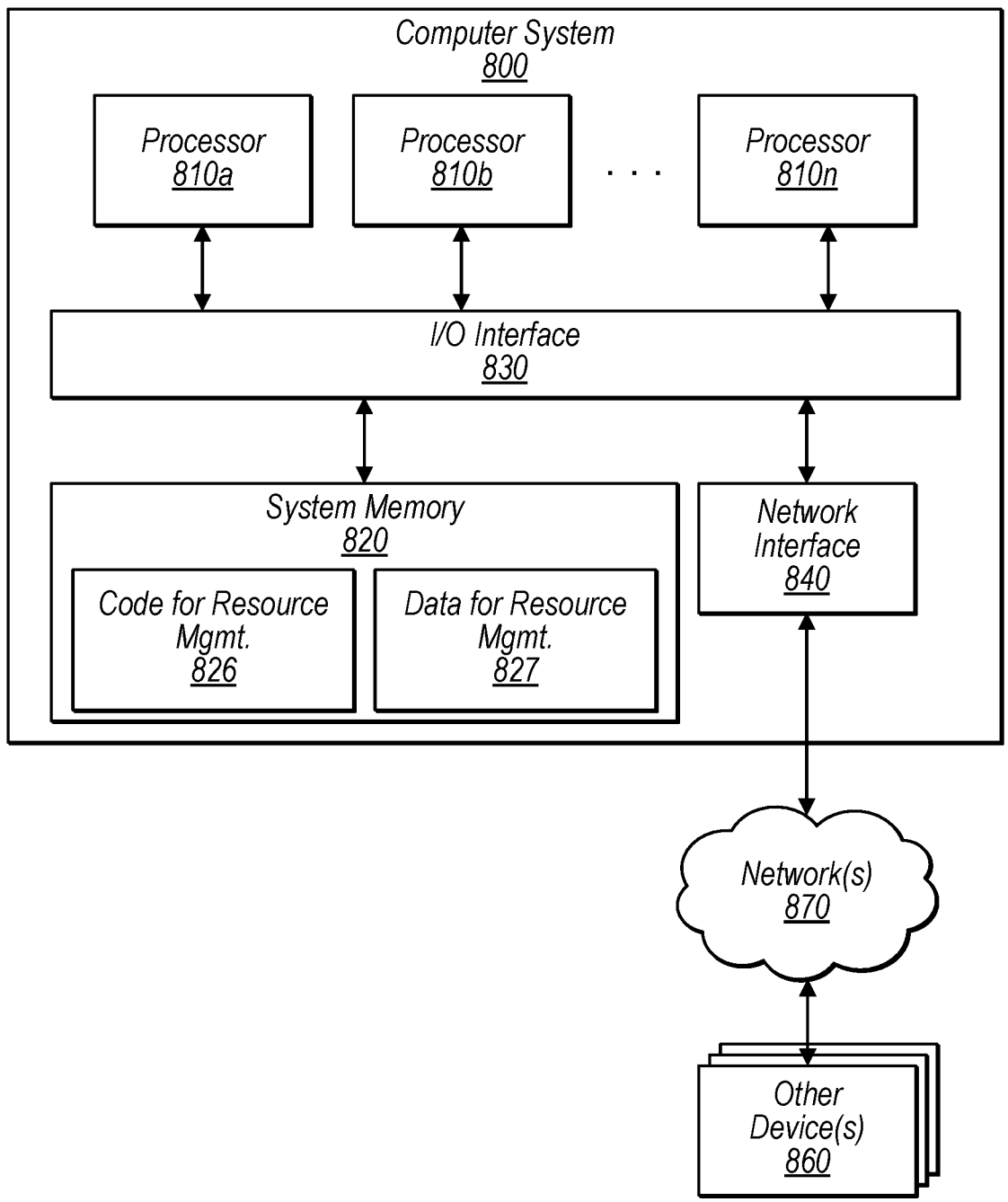
FIG. 8 is a block diagram showing an example computing system to implement the various techniques described herein, according to some embodiments.

FIG. 8 shows an example computing system to implement the various techniques described herein, according to some embodiments. For example, in one embodiment, the capacity management of the resources of a service provider network allocated in multiple global regions may be implemented by a computer system, for instance, a computer system as in FIG. 8 that includes one or more processors executing program instructions stored on a computer-readable storage medium coupled to the processors. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in some embodiments a computer system 800 may include one computing device or any number of computing devices configured to work together as a single computer system 800.

In some embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in some embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be one embodiment of a computer-accessible medium configured to store instructions and data accessible by processor(s) 810. In some embodiments, system memory 820 may be implemented using any non-transitory storage media or memory media, such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the illustrated embodiment, program instructions (e.g., code) and data implementing one or more desired functions, such as the capacity management described above in FIGS. 1-7, are shown stored within system memory 830 as code 826 and data 827.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850. In some embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data as described above for FIG. 1-xx. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Some embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
a plurality of computing devices configured to implement a cloud-based service across a first and a second regions, wherein the first and second regions are at two different geographic locations respectively including a first and a second pluralities of distinct locations within the first and second regions, wherein the first and second pluralities of distinct locations respectively host a first and second pluralities of interconnected data centers allocated at the first and second pluralities of distinct locations within the first and second regions, wherein the data centers are configured such that one data center at a distinct location is isolated from an operative failure in another data center at another distinct location within a same region, wherein the first and second pluralities of interconnected data centers respectively include a control plane as part of the cloud-based service, wherein the first plurality of interconnected data centers in the first region is configured to:
receive a request from a client of the cloud-based service, at a first control plane of the first plurality of interconnected data centers in the first region, to create a first and a second replicas of a database respectively in the first plurality and second plurality of interconnected data centers in the first and second regions;
determine a capacity of the first plurality of interconnected data centers in the first region as to serving the first replica of the database in the first region;
send a request, from the first control plane of the first plurality of interconnected data centers in the first region, to a second control plane of the second plurality of interconnected data centers in the second region to determine a capacity of the second plurality of interconnected data centers in the second region as to serving the second replica of the database in the second region; and
provide a response, from the first control plane of the first plurality of interconnected data centers in the first region, based at least in part on the determined capacities of the first plurality and second plurality of interconnected data centers so to serving the first and second replicas of the database in the first and second regions.

2. The system of claim 1, wherein the first plurality of interconnected data centers in the first region is further configured to:
send a second request, from the first control plane of the first plurality of interconnected data centers in the first region, to the second control plane of the second plurality of interconnected data centers in the second region to provision one or more resources based at least in part on determining that the capacity of the second plurality of interconnected data centers is sufficient to serve the second replica of the database in the second region.

3. The system of claim 1, wherein the first plurality of interconnected data centers in the first region is further configured to:
receive a third request, at the first control plane of the first plurality of interconnected data centers in the first region, to create a first and a second replicas of a second database respectively in the first plurality and second plurality of interconnected data centers in the first and second regions;
provide an initial response, from the first control plane of the first plurality of interconnected data centers in the first region, in response to the third request;
send a fourth request, from the first control plane of the first plurality of interconnected data centers in the first region, to the second control plane of the second plurality of interconnected data centers in the second region to determine a capacity of the second plurality of interconnected data centers in the second region as to serving the second replica of the second database in the second region; and
provide an updated response, from the first control plane of the first plurality of interconnected data centers in the first region, based at least in part on the determined capacity of the second plurality of interconnected data centers as to serving the second replica of the second database in the second region.

4. The system of claim 1, wherein the receive, the determine, the send, and the provide are implemented as part of a capacity management service of the cloud-based service offered by a provider network, and wherein a record of the database is received via a network-based interface and stored in one or more resources that are implemented as part of the cloud-based service or a storage service offered by the provider network.

5. A method, comprising:
receiving, at a control plane for an instantiation of a service in a first region, a request from a client of the service to create replicas of a service resource hosted in the service respectively in the first region comprising a first plurality of data centers and a second region comprising a second plurality of data centers, wherein the first region and the second region implement respective instantiations of the service at different respective geographic locations, wherein operative failures are isolated between the first region and the second region; and
responsive to the request:
sending, from the control plane for the instantiation of the service in the first region, a request to a control plane for the instantiation of the service in the second region to confirm a capacity of the second plurality of data centers to host the replica of the service resource;
determining, by the control plane for the instantiation of the service in the first region, whether the replica can be created in the second region based at least in part on the determined capacity of the second region to host the replica of the service resource in the respective instantiation of the service; and
providing, by the control plane for the instantiation of the service in the first region, a response that indicates the determination.

6. The method of claim 5, further comprising:
in response to determining that the replica can be created in the second region, sending a second request to the control plane of the second region to provision one or more resources to host the service resource in the respective instantiation of the service in the second region.

7. The method of claim 5, further comprising:
receiving a third request to create replicas of a second service resource hosted in the service respectively in the first region and the second region; and providing an initial response responsive to the third request;

sending a fourth request to the control plane for the instantiation of the second service in the second region to confirm a capacity of the second plurality of data centers to host the replica of the second service resource; and providing an updated response, based at least in part on the determined capacity of the second region to host the replica of the second service resource in the respective instantiation of the service in the second region.

8. The method of claim 5, wherein the respective instantiations of the service of the first region and the second region collectively implement a global cloud service across multiple regions.

9. The method of claim 8, wherein the global cloud service comprises at least one of a storage service, a computing service, a media streaming service, an e-mail service, or a networking service.

10. The method of claim 5, wherein the request comprises information specifying a time window for providing the response.

11. The method of claim 5, wherein the response comprises information indicating an estimated time when the service resource becomes available in the respective instantiation of the service in the second region.

12. The method of claim 5, wherein the receiving, the sending, and the providing are implemented as part of a service offered by a provider network, and wherein the service resource is received via a network-based interface and hosted on one or more resources that are implemented as part of the service or another service offered by the provider network.

13. One or more non-transitory, computer readable media, storing program instructions that when executed on or across one or more computing devices, cause the one or more computing devices to implement:

receiving, at a control plane for an instantiation of a service in a first region, a request from a client of the service to create replicas of a service resource hosted in the service respectively in the first region comprising a first plurality of data centers and a second region comprising a second plurality of data centers, wherein the first region and the second region implement respective instantiations of the service at different respective geographic locations, wherein operative failures are isolated between the first region and the second region;

sending, from the control plane for the instantiation of the service in the first region, a request to a control plane for the instantiation of the service in the second region to confirm a capacity of the second plurality of data centers to host the replica of the service resource; and providing, by the control plane for the instantiation of the service in the first region, a response indicating a determination whether the replica can be created in the second region based at least in part on the determined capacity of the second regions to host the replica of the service resource in the respective instantiations of the service.

14. The one or more non-transitory, computer readable media of claim 13, further storing program instructions that when executed on or across the one or more computing devices, cause the one or more computing devices to implement:

in response to determining that the replica cannot be created in the second region, refraining from providing a corresponding request to the control plane of the second region to provision resources for hosting the service resource in the respective instantiation of the service in the second region.

15. The one or more non-transitory, computer readable media of claim 13, storing program instructions that when executed on or across the one or more computing devices, cause the one or more computing devices to implement:

receiving a third request to create replicas of a second service resource hosted in the service respectively in the first region and the second region;

providing an initial response responsive to the third request;

sending a fourth request to the control plane for the instantiation of the second service in the second region to confirm a capacity of the second plurality of data centers to host the replica of the second service resource; and providing an updated response, based at least in part on the determined capacity of the second region to host the replica of the second service resource in the respective instantiation of the service in the second region.

16. The one or more non-transitory, computer readable media of claim 13, wherein the respective instantiations of the service of the first region and the second region collectively implement a global cloud service across multiple regions.

17. The one or more non-transitory, computer readable media of claim 16, wherein the global cloud service comprises at least one of a storage service, a computing service, a media streaming service, an e-mail service, or a networking service.

18. The one or more non-transitory, computer readable media of claim 13, wherein the request comprises information specifying a time window for providing the response.

19. The one or more non-transitory, computer readable media of claim 13, wherein the response comprises information indicating an estimated time when the service resource becomes available in the respective instantiation of the service in the second region.

20. The one or more non-transitory, computer readable media of claim 13, wherein the receiving, the sending, and the providing are implemented as part of a service offered by a provider network, and wherein the service resource is received via a network-based interface and hosted on one or more resources that are implemented as part of the service or another service offered by the provider network.

* * * * *